US007697485B2

United States Patent
Liu et al.

(10) Patent No.: US 7,697,485 B2
(45) Date of Patent: Apr. 13, 2010

(54) METHOD FOR IMPROVING THE PERFORMANCE OF A WIRELESS COMMUNICATIONS NETWORK BY USING BEAMFORMED VIRTUAL ANTENNAS

(75) Inventors: Qingwen Liu, Richardson, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/743,510

(22) Filed: May 2, 2007

(65) Prior Publication Data

US 2008/0089274 A1    Apr. 17, 2008

Related U.S. Application Data

(60) Provisional application No. 60/850,847, filed on Oct. 11, 2006.

(51) Int. Cl.
*H04Q 7/00* (2006.01)

(52) U.S. Cl. .................. 370/334; 370/328; 370/79; 370/78; 455/562.1; 455/526; 455/575.7

(58) Field of Classification Search ................. 370/248, 370/329, 334, 328, 79, 78; 375/267; 455/562.1, 455/526, 575.7
See application file for complete search history.

(56) References Cited

U.S. PATENT DOCUMENTS

| 2005/0282548 A1* | 12/2005 | Kim et al. ................. 455/436 |
| 2006/0126519 A1* | 6/2006 | Rensburg et al. ............ 370/248 |
| 2007/0015543 A1* | 1/2007 | Ojard ..................... 455/562.1 |
| 2007/0127586 A1* | 6/2007 | Hafeez ..................... 375/267 |

* cited by examiner

*Primary Examiner*—Vincent P Harper
*Assistant Examiner*—Fred A Casca

(57) ABSTRACT

The present invention discloses a method for wireless communications network performance in transmitting a message. The method comprises creating a first beamformed virtual antenna for the serving BTS and one or more second beamformed virtual antennas for the one or more target BTSs when one or more predetermined conditions are met, establishing a first beamformed channel by using the first beamformed virtual antenna, establishing one or more second beamformed channels by using the one or more second beamformed virtual antennas, and transmitting a plurality of signals comprising the message via the first and the one or more second beamformed channels.

25 Claims, 1 Drawing Sheet

METHOD FOR IMPROVING THE PERFORMANCE OF A WIRELESS COMMUNICATIONS NETWORK BY USING BEAMFORMED VIRTUAL ANTENNAS

CROSS REFERENCE

The present application claims the benefit of U.S. Provisional Application Ser. No. 60/850,847, which was filed on Oct. 11, 2006.

BACKGROUND

One issue that a wireless communications network often faces is that its performance is degraded when the signal strength of receiving signals of customer premises equipment (CPE), e.g. a mobile station (MS), is weakened as a result of changes in geological locations or channel conditions of the CPE. The capability of having multiple antennas on a base transceiver station (BTS) is one of the contributing factors for the development of various techniques to deal with this issue.

Signal strength degrades in various situations. For example, the closer a CPE gets to the border of two cells, the weaker signal strength becomes. Signal strength becomes the weakest when a CPE is located on the border, as it is farthest from the BTSs serving the corresponding cells. Weakened signals result in degraded services received by the CPE.

Another situation in which services received by a CPE are degraded is when a handover process occurs. Handover typically happens when a CPE moves away from the cell in which a serving BTS resides and enters an adjacent cell that is served by another BTS; namely, a target BTS, which results in switching wireless connection from the serving BTS to the target BTS. One requirement of handover is that wireless connectivity needs to be maintained throughout the process.

In order to improve the performance of a wireless communications network, a BTS equipped with multiple antennas employs one of the following techniques: beamforming, space-time coding (STC), or spatial multiplexing/multi-input-multi-output (MIMO). Beamforming improves the signal-to-interference-plus-noise ratio (SINR). STC provides spatial diversity while MIMO provides spatial multiplexing.

These techniques can be adopted by different kinds of wireless/mobile networks, such as cellular networks, local area networks (WLAN), personal area networks (WPAN), and sensor networks. They are also applicable to various multiple access methods such as time-division-multiple-access (TDMA), frequency-division-multiple-access (FDMA), code-division-multiple-access (CDMA), wave-division-multiple-access (WDMA), and orthogonal-frequency-division-multiple-access (OFDMA).

Although conventional methods improve the services provided to a CPE, the quality of these services is not optimal in some cases. Therefore, what is desired is a method to further improve services received by a CPE when signal strength degrades as a result of being close to the border of a plurality of cells.

SUMMARY

The present invention discloses a method for wireless communications network performance in transmitting a message. The method comprises creating a first beamformed virtual antenna for the serving BTS and one or more second beamformed virtual antennas for the one or more target BTSs when one or more predetermined conditions are met, establishing a first beamformed channel by using the first beamformed virtual antenna, establishing one or more second beamformed channels by using the one or more second beamformed virtual antennas, and transmitting a plurality of signals comprising the message via the first and the one or more second beamformed channels.

The construction and method of operation of the invention, however, together with additional objects and advantages thereof, will be best understood from the following description of specific embodiments when read in connection with the accompanying drawings.

BRIEF DESCRIPTION OF THE DRAWING

The drawings accompanying and forming part of this specification are included to depict certain aspects of the invention. The invention may be better understood by reference to one or more of these drawings in combination with the description presented herein. It should be noted that the features illustrated in the drawings are not necessarily drawn to scale.

DESCRIPTION

Figure 1:
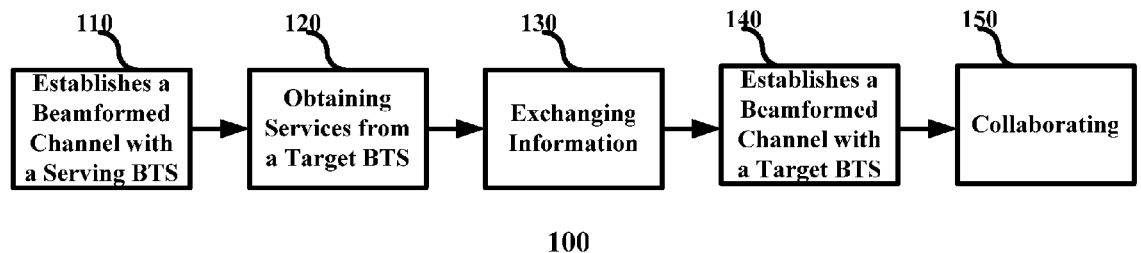
FIG. 1 is a flow diagram illustrating a method for improving services provided to a CPE in accordance with the present invention.

The following detailed description of the invention refers to the accompanying drawings. The description includes exemplary embodiments, not excluding other embodiments, and changes may be made to the embodiments described without departing from the spirit and scope of the invention. The following detailed description does not limit the invention. Instead, the scope of the invention is defined by the appended claims.

The present invention discloses a method for improving services provided to customer premises equipment by utilizing a beamforming method that creates beamformed virtual antennas between a CPE and a plurality of BTSs. In conjunction with the use of space-time-coding or multi-input-multi-output, the present invention improves channel quality and increases throughput of the wireless communications network. The CPE considers signals that it receives via a beamformed channel to be coming from a beamformed virtual antenna. The BTSs work in collaboration to enhance receiving signal strength or increase the diversity of signals received by a CPE.

FIG. 1 is a flow diagram illustrating a method 100 for improving services provided to a CPE in accordance with the present invention. The method 100 begins with step 110 where a CPE establishes a beamformed channel with a serving BTS equipped with multiple antennas. The serving BTS serves the cell where the CPE is located. The CPE considers signals received via the beamformed channel to be coming from a beamformed virtual antenna.

The CPE constantly monitors the following parameters: the signal-to-interference-plus-noise ratio (SINR), Received Signal Strength Indication (RSSI), and the distance between the CPE and the BTSs. The CPE or the serving BTS initiates a collaboration process when some predetermined criterion is met. For example, if the SINR of CPE-to-Serving-BTS is below a predetermined threshold or the SINR of CPE-to-Target-BTS is above a predetermined threshold, the collaboration process begins.

In step 120, the CPE registers itself with one or more target BTSs equipped with multiple antennas in the adjacent cells via a dedicated access channel. Registering with a target BTS could also be completed by a serving BTS that informs the target BTS and then registers a request for service for the CPE. After the registration, the CPE obtains service from the one or more target BTSs.

In step 130, the serving BTS transmits information pertinent to the CPE, such as control and data information and beamforming parameters, to the one or more target BTSs. In step 140, the one or more target BTSs establish one or more beamformed channels with the CPE using the information received from the serving BTS. As shown in step 110, the CPE considers signals that it receives via the one or more beamformed channels to be coming from one or more beamformed virtual antennas. The one or more target BTSs relay all the information about the CPE to the serving BTS.

In Step 150, the serving BTS and the one or more target BTSs work in collaboration when transmitting data to the CPE via the one or more beamformed channels, i.e., from the one or more beamformed virtual antennas. As a result, the receiving signal strength of the CPE is consequently improved.

One embodiment of the present invention is using space-time coding (STC) with beamformed virtual antennas. Assume that in a wireless communications network there are two BTSs working in collaboration in accordance to the present invention. Using an Alamouti STC coding method for downlink transmission, two symbols, $s_0$ and $S_1$, are transmitted by each beamformed virtual antenna at consecutive time instances. For example, the first beamformed virtual antenna transmits a signal $s_0$ at time T and a signal $-S^*_1$ at time T+$\Delta$t. The second beamformed virtual antenna transmits a signal $S_1$ at time T and a signal $S^*_0$ at time T+$\Delta$t. After the CPE receives two signals at consecutive times T and T+$\Delta$t from each beamformed channel, it combines them in order to decode the original signals ($s_0$ and $S_1$). Although only a scheme of Alamouti code is illustrated, other kinds of STCs can be adopted in the system in a similar fashion.

Another embodiment of the present invention is using the two beamformed virtual antennas in conjunction with an MIMO method. The spatial-multiplexing coding technique is used in an MIMO system that consists of beamformed virtual antennas of BTSs and multiple antennas on CPEs. One example of an MIMO system is Bell labs layered space-time (BLAST) coding.

In summary, a CPE establishes a separate beamformed channel with each of the two or more BTSs concurrently; namely, one between the CPE and the serving BTS and one between the CPE and each of the one or more target BTSs, as shown in steps 110 and 140. During the process of collaboration each of the BTSs has the same information about the CPE as the rest do.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method comprising:
    creating a first beamformed virtual antenna for a serving base transceiver station (BTS) that is currently in communication with a customer premises apparatus;
    establishing a first beamformed channel using the first beamformed virtual antenna;
    when one or more predetermined conditions are met at the serving BTS or customer premises apparatus:
        initiating collaboration between the serving BTS and one or more target BTSs in order for the serving BTS and the one or more target BTSs to communicate information related to beamforming parameters with respect to the customer premises apparatus;
        creating one or more second beamformed virtual antennas for the one or more target BTSs with respect to the customer premises apparatus based on information related to the beamforming parameters communicated by the serving BTS to the one or more target BTSs;
        establishing one or more second beamformed channels from the one or more target BTSs to the customer premises apparatus using the one or more second beamformed virtual antennas; and
    transmitting a plurality of signals via the first beamformed channel and the one or more second beamformed channels to the customer premises apparatus concurrently, wherein the plurality of signals in combination comprise a message intended for the customer premises apparatus, and wherein the serving BTS and the one or more target BTSs work in collaboration during beamforming to enhance the received signal strength and/or diversity of the plurality of signals received by the customer premises apparatus.

2. The method of claim 1, wherein creating a first beamformed virtual antenna comprises applying a plurality of beamforming weighting vectors to transmissions made by the serving BTS and wherein creating one or more second beamformed virtual antennas comprises applying a plurality of beamforming weighting vectors to transmissions made by the one or more target BTSs.

3. The method of claim 1, wherein the one or more predetermined conditions are selected from the group consisting of a signal-to-interference-plus-noise ratio (SINR), a Received Signal Strength Indication (RSSI), and a distance between the customer premises apparatus and the BTSs.

4. The method of claim 1, wherein initiating collaboration between the serving BTS and the one or more target BTSs comprises communicating via a dedicated access channel.

5. The method of claim 1, wherein initiating collaboration between the serving BTS and the one or more target BTSs comprises registering a request for service with the one or more target BTSs by the serving BTS for the customer premises apparatus.

6. The method of claim 1, wherein the information related to the beamforming parameters comprises control and data information and parameters of a beamformed channel for the customer premises apparatus.

7. The method of claim 1, wherein transmitting comprises:
    transmitting a first signal at a time T and a variation of a second signal at a time T+$\Delta$t from the first beamformed channel; and
    transmitting the second signal at the time T and a variation of the first signal at the time T+$\Delta$t from the one or more second beamformed channels.

8. The method of claim 7, wherein the variations of the first and second signals are defined according to a space-time coding technique.

9. The method of claim 1, wherein transmitting comprises transmitting the plurality of signals using the first beamformed virtual antenna and the one or more second beamformed virtual antennas according to a spatial multiplexing multiple-input multiple-output communication technique.

10. The method of claim 1, wherein initiating collaboration comprises initiating communication by the serving BTS.

11. The method of claim 1, wherein initiating collaboration comprises initiating communication by the customer premises apparatus.

12. The method of claim 1, and further comprising communicating information between the serving BTS and each of the one or more target BTSs such that the serving BTS and the one or more target BTSs have access to the same information related to the beamforming parameters for the customer premises apparatus and the message intended for the customer premises apparatus, and wherein transmitting the plurality of signals comprises transmitting the message comprised of the plurality of signals from the serving BTS and each of the one or more target BTSs such that the serving BTS and each of the one or more target BTSs individually beamform said message to the customer premises apparatus.

13. A method comprising:
creating a first beamformed virtual antenna for a serving BTS that is currently in communication with a customer premises apparatus;
establishing a first beamformed channel using the first beamformed virtual antenna;
when one or more channel conditions of the serving BTS or customer premises apparatus meet one or more predetermined criteria selected from the group consisting of a signal-to- interference-plus-noise ratio (SINR), a received signal strength indication (RSSI), and a distance between the customer premises apparatus and the serving BTS or one or more target BTSs:
initiating collaboration between the serving BTS and one or more target BTSs in order for the serving BTS and the one or more target BTSs to communicate information related to beamforming parameters with respect to the customer premises apparatus;
creating one or more second beamformed virtual antennas for the one or more target BTSs with respect to the customer premises apparatus based on information related to the beamforming parameters communicated by the serving BTS to the one or more target BTSs;
establishing one or more second beamformed channels from the one or more target BTSs to the customer premises apparatus using the one or more second beamformed virtual antennas; and
transmitting a plurality of signals to the customer premises apparatus comprising transmitting a first signal at a time T and a variation of a second signal at a time T+$\Delta$t via the first beamformed channel and transmitting one or more second signals at the time T and a variation of the first signal at the time T+$\Delta$t via the one or more second beamformed channels, wherein the plurality of signals in combination comprise a message intended for the customer premises apparatus, and wherein the serving BTS and the one or more target BTSs work concurrently and in collaboration during beamforming to enhance the received signal strength and/or diversity of the plurality of signals received by the customer premises apparatus.

14. The method of claim 13, wherein creating the first beamformed virtual antenna comprises applying a plurality of beamforming weighting vectors to transmissions made by the serving BTS and wherein creating one or more second beamformed virtual antennas comprises applying a plurality of beamforming weighting vectors to transmissions made by the one or more target BTSs.

15. The method of claim 13, wherein initiating collaboration between the serving BTS and the one or more target BTSs comprises communicating via a dedicated access channel.

16. The method of claim 13, wherein initiating collaboration between the serving BTS and the one or more target BTSs comprises registering a request for service with the one or more target BTSs by the serving BTS for the customer premises apparatus.

17. The method of claim 13, wherein the information related to the beamforming parameters comprises control and data information and parameters of a beamformed channel for the customer premises apparatus.

18. The method of claim 13, and further comprising communicating information between the serving BTS and each of the one or more target BTSs such that the serving BTS and the one or more target BTSs have access to the same information related to the beamforming parameters for the customer premises apparatus and the message intended for the customer premises apparatus, wherein transmitting comprises transmitting said message comprised of the plurality of signals from the serving BTS and each of the one or more target BTSs such that the serving BTS and each of the one or more target BTSs individually beamform said message to the customer premises apparatus.

19. A method comprising:
creating a first beamformed virtual antenna for a serving BTS that is currently in communication with a customer premises apparatus;
establishing a first beamformed channel using the first beamformed virtual antenna;
when one or more channel conditions of the serving BTS or customer premises apparatus meet one or more predetermined criteria selected from the group consisting of a signal-to-interference-plus-noise ratio (SINR), a received signal strength indication (RSSI), and a distance between the customer premises apparatus and the serving BTS or one or more target BTSs:
initiating collaboration between the serving BTS and one or more target BTSs in order for the serving BTS and the one or more target BTSs to communicate information related to beamforming parameters with respect to the customer premises apparatus;
creating one or more second beamformed virtual antennas for the one or more target BTSs with respect to the customer premises apparatus based on information related to the beamforming parameters communicated by the serving BTS to the one or more target BTSs;
establishing one or more second beamformed channels from the one or more target BTSs to the customer premises apparatus using the one or more second beamformed virtual antennas; and
transmitting a plurality of signals via the first beamformed channel and the one or more second beamformed channels using the first beamformed virtual antenna and the one or more second beamformed virtual antennas according to a spatial multiplexing multiple-input multiple-output communication technique, wherein the plurality of signals in combination comprise a message intended for the customer premises apparatus, and wherein the serving BTS and the one or more target BTSs work concurrently and in collaboration during beamforming to enhance the received signal strength and/or diversity of the plurality of signals received by the customer premises apparatus.

20. The method of claim 19, wherein creating the first beamformed virtual antenna comprises applying a plurality of beamforming weighting vectors to transmissions made by the serving BTS and wherein creating one or more second beamformed virtual antennas comprises applying a plurality of beamforming weighting vectors to transmissions made by the one or more target BTSs.

21. The method of claim 19, wherein initiating collaboration between the serving BTS and the one or more target BTSs comprises communicating via a dedicated access channel.

22. The method of claim 19, wherein initiating collaboration between the serving BTS and the one or more target BTSs comprises registering a request for service with the one or more target BTSs by the serving BTS for the customer premises apparatus.

23. The method of claim 19, wherein the information related to the beamforming parameters comprises control and data information and parameters of a beamformed channel for the customer premises apparatus.

24. The method of claim 19, wherein the spatial multiplexing multiple-input multiple-output communication technique comprises a layered space-time coding technique.

25. The method of claim 19, and further comprising communicating information between the serving BTS and each of the one or more target BTSs such that the serving BTS and the one or more target BTSs have access to the same information related to the beamforming parameters for the customer premises apparatus and a message comprised of the plurality of signals intended for the customer premises apparatus, and wherein transmitting the plurality of signals comprises transmitting the message comprised of the plurality of signals from the serving BTS and each of the one or more target BTSs such that the serving BTS and each of the one or more target BTSs individually beamform said message to the customer premises apparatus.

* * * * *